United States Patent
Hakes et al.

(10) Patent No.: US 9,376,149 B2
(45) Date of Patent: Jun. 28, 2016

(54) ARTICULATING TRACK SYSTEM

(71) Applicant: CATERPILLAR INC., Peoria, IL (US)

(72) Inventors: David J. Hakes, Brimfield, IL (US); Benoit Abello, Dunlap, IL (US)

(73) Assignee: Caterpillar Inc., Peoria, IL (US)

( * ) Notice: Subject to any disclaimer, the term of this patent is extended or adjusted under 35 U.S.C. 154(b) by 21 days.

(21) Appl. No.: 14/289,464

(22) Filed: May 28, 2014

(65) Prior Publication Data

US 2015/0344088 A1    Dec. 3, 2015

(51) Int. Cl.
| | | |
|---|---|---|
| *B62D 55/20* | (2006.01) | |
| *B62D 55/14* | (2006.01) | |
| *B62D 55/21* | (2006.01) | |

(52) U.S. Cl.
CPC .............. *B62D 55/202* (2013.01); *B62D 55/14* (2013.01); *B62D 55/21* (2013.01)

(58) Field of Classification Search
CPC ...... B62D 55/18; B62D 55/202; B62D 55/14; B62D 55/145; B62D 55/21
USPC .......................................... 305/124, 136, 137
See application file for complete search history.

(56) References Cited

U.S. PATENT DOCUMENTS

| | | | | |
|---|---|---|---|---|
| 5,409,306 A | * | 4/1995 | Bentz ...................... | B62D 55/20 305/185 |
| 5,685,620 A | | 11/1997 | Bertoni | |
| 6,129,426 A | * | 10/2000 | Tucker ................. | B62D 55/065 305/136 |
| 6,659,573 B1 | | 12/2003 | Knecht et al. | |
| 6,929,335 B2 | * | 8/2005 | Colwell ................. | B62D 55/14 305/194 |
| 8,465,110 B2 | * | 6/2013 | Clarke ................. | B62D 55/145 305/145 |
| 2012/0228926 A1 | * | 9/2012 | Bair ....................... | B62D 55/14 305/136 |
| 2015/0197294 A1 | * | 7/2015 | Hakes .................. | B62D 55/202 305/142 |

FOREIGN PATENT DOCUMENTS

EP    1253070    10/2002

OTHER PUBLICATIONS

Nonpublished U.S. Appl. No. 14/154,768, filed Jan. 14, 2014 in 19 pages.

* cited by examiner

*Primary Examiner* — John Walters
(74) *Attorney, Agent, or Firm* — Procopio, Cory, Hargreaves & Savitch LLP

(57) ABSTRACT

A track pad of an articulating track system for a machine is disclosed. The track pad includes a ground engaging portion and a body portion. The ground engaging portion includes a ground engaging surface that engages the ground during operation of the machine. The body portion extends from the ground engaging portion in a direction opposite the ground engaging surface. The body portion includes a roller engaging surface distal to the ground engaging surface. The roller engaging surface is a convex surface that matches the curvature of a roller surface for a roller of the machine.

20 Claims, 3 Drawing Sheets

ARTICULATING TRACK SYSTEM

TECHNICAL FIELD

The present disclosure generally pertains to undercarriage track systems, and is directed toward an articulating track system for mining and construction machinery.

BACKGROUND

Mining and construction machines, such as hydraulic mining shovels, excavators, wheel loaders, cable shovels, bucket wheels, and draglines commonly employ undercarriage track systems. The undercarriage track systems generally employ a track chain assembly formed by interconnected track pads. The track chain assembly is generally guided and supported by rollers. The contact between the track pads and the rollers may create high Hertzian stress, which can cause wear, such as spalling and abrasive wear, along surfaces of the track pads, particularly when the machine is inclined and the track pads are angled relative to the rollers. The track roller path of machines used in heavy-duty applications may be susceptible to wear and spall under relatively modest angles of articulation due to Hertzian stresses developed in mating surfaces of the track pads and rollers.

Attempts have been made to extend the wear life of the undercarriage track system through modification of the roller and/or track pad structures. U.S. Pat. No. 5,752,574 to Oertley, for example, discloses an arrangement wherein first and second track guiding rollers are connected to respective parallel roller frame assemblies with axes of rotation of each guide roller in a substantially non-perpendicular relationship to the longitudinally extending centerline, producing a "toe-out" or "toe-in" of the guide rollers.

The present disclosure is directed toward overcoming one or more of the problems discovered by the inventors.

SUMMARY OF THE DISCLOSURE

A track pad of an articulating track system for a machine is disclosed. In one embodiment, the track pad includes a ground engaging portion, a body portion, a first side rail, and a second side rail. The ground engaging portion includes a ground engaging surface that engages the ground during operation of the machine. The body portion extends from the ground engaging portion in a direction opposite the ground engaging surface. The body portion includes a first end, a second end opposite the first end, and a roller engaging surface distal to the ground engaging surface. The roller engaging surface is a convex surface. The first side rail extends from the ground engaging portion in the same direction as the body portion. The first side rail is spaced apart from the body portion forming a first roller edge gap there between. The second side rail extends from the ground engaging portion in the same direction as the body portion. The second side rail is located opposite the first side rail and is spaced apart from the body portion forming a second roller edge gap there between.

DETAILED DESCRIPTION

The systems disclosed herein include an articulating track system for a machine. In embodiments, the articulating track system includes a track pad including a convex roller contacting surface and a roller including a concave roller surface. These concavities may help maintain 100 percent contact between the roller contacting surface and the roller surface for at least 10 degrees of articulation between the track pad and the roller. Maintaining 100 percent contact between these surfaces may reduce wear and spalling on these surfaces.

Figure 1:
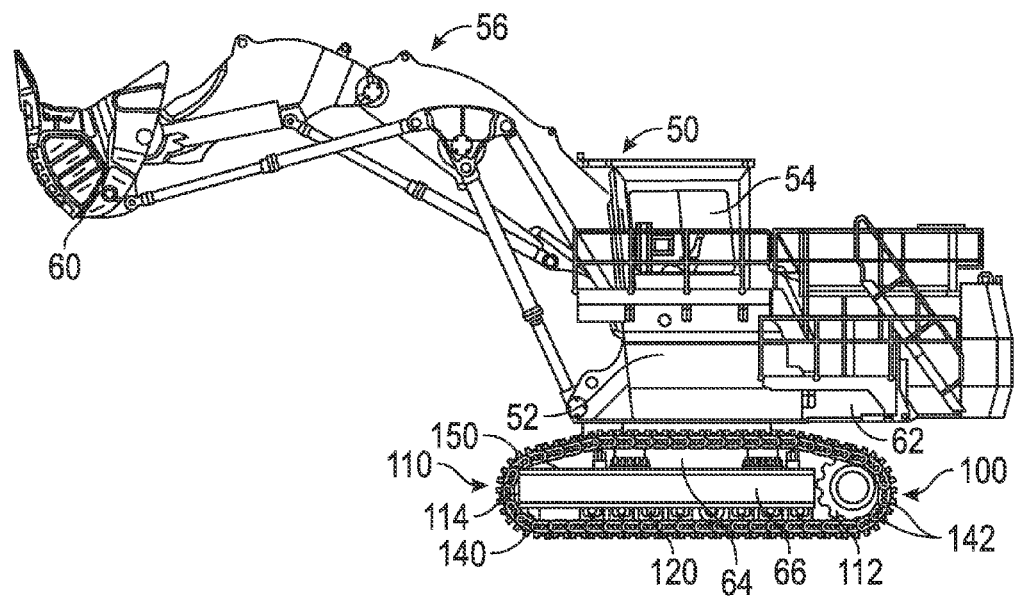
FIG. 1 is a diagrammatic side elevational view of an embodiment of a machine including an articulating track system.

FIG. 1 is a diagrammatic side elevational view of an embodiment of a machine 50 including an articulating track system 100. The term "machine" may refer to any machine that that performs some type of operation associated with an industry such as mining or construction, or any other industry known in the art, such as a hydraulic mining shovel, an excavator, wheel loader, cable shovel, dragline, or the like. In the embodiment illustrated, the machine 50 is a hydraulic mining shovel.

The machine 50 may include a main frame 62, a body 52, a boom system 56, an implement 60, and an undercarriage structure 64. The main frame 62 may support the body 52 and may connect the body 52 to the undercarriage structure 64. The body 52 may include a cab 54 to house a machine operator. A control system can be housed in the cab 54 that can be adapted to allow a machine operator to manipulate and articulate the implement 60 for digging, excavating, or any other suitable application.

The boom system 56 may pivotally connect at one end to the body 52 and may support the implement 60 at an opposing, distal end. In embodiments, the implement 60 can be any suitable implement, such as a bucket, a clamshell, a blade, or any other type of suitable device.

The undercarriage structure 64 may include a supporting structure 66 and an articulating track system 100. The supporting structure 66 may connect the articulating track system 100 to the main frame 62 and may support the articulating track system 100.

The articulating track system 100 may include a track roller frame assembly 110 and an associated track chain assembly 140 on each side of the undercarriage structure 64. It will be appreciated that only one track roller frame assembly 110 and only one track chain assembly 140 is visible in FIG. 1.

Each track roller frame assembly 110 may include an idler wheel 112, a drive sprocket wheel 114, and rollers 120. The idler wheel 112 may be coupled to one end of the supporting structure 66, while the drive sprocket wheel 114 may be coupled to the opposite end of the supporting structure 66. The drive sprocket wheel 114 is powered in forward and reverse directions by an engine of machine 50. The drive sprocket wheel 114 drives the track chain assembly 140 to move the machine 50. Rollers 120 may be positioned between the idler wheel 112 and the drive sprocket wheel 114. Idler wheel 112 and rollers 120 may be configured to guide a track chain assembly 140 around the supporting structure 66.

Figure 2:
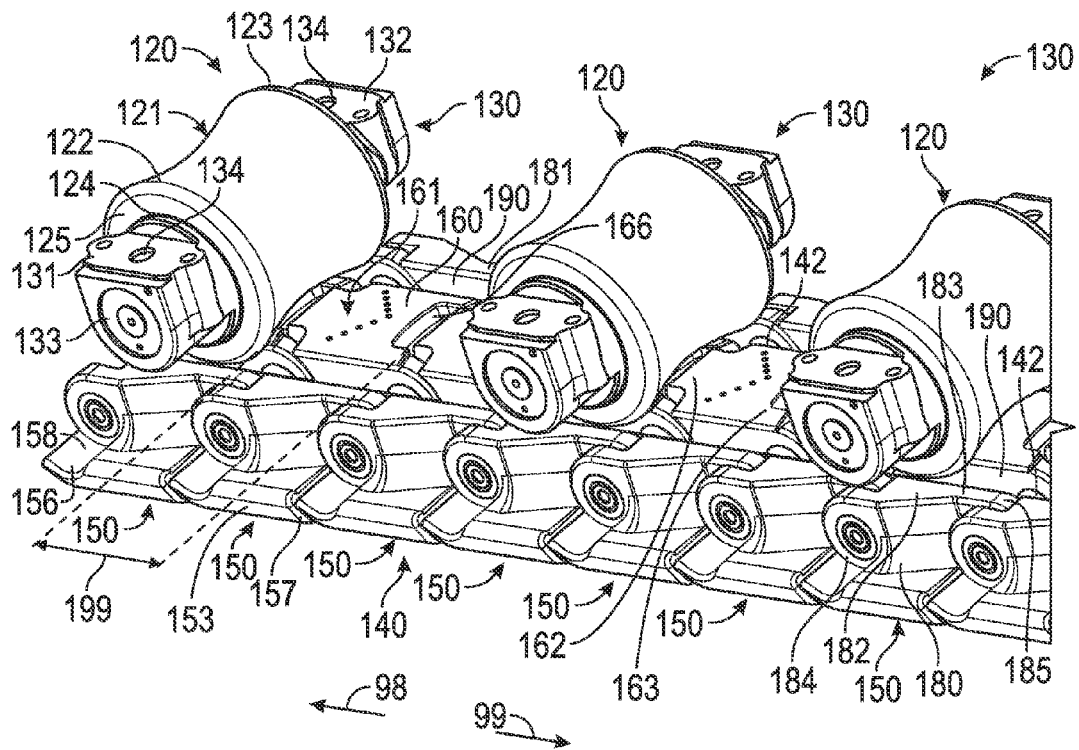
FIG. 2 is a perspective view of a portion of the track chain assembly contacting rollers.
Figure 3:
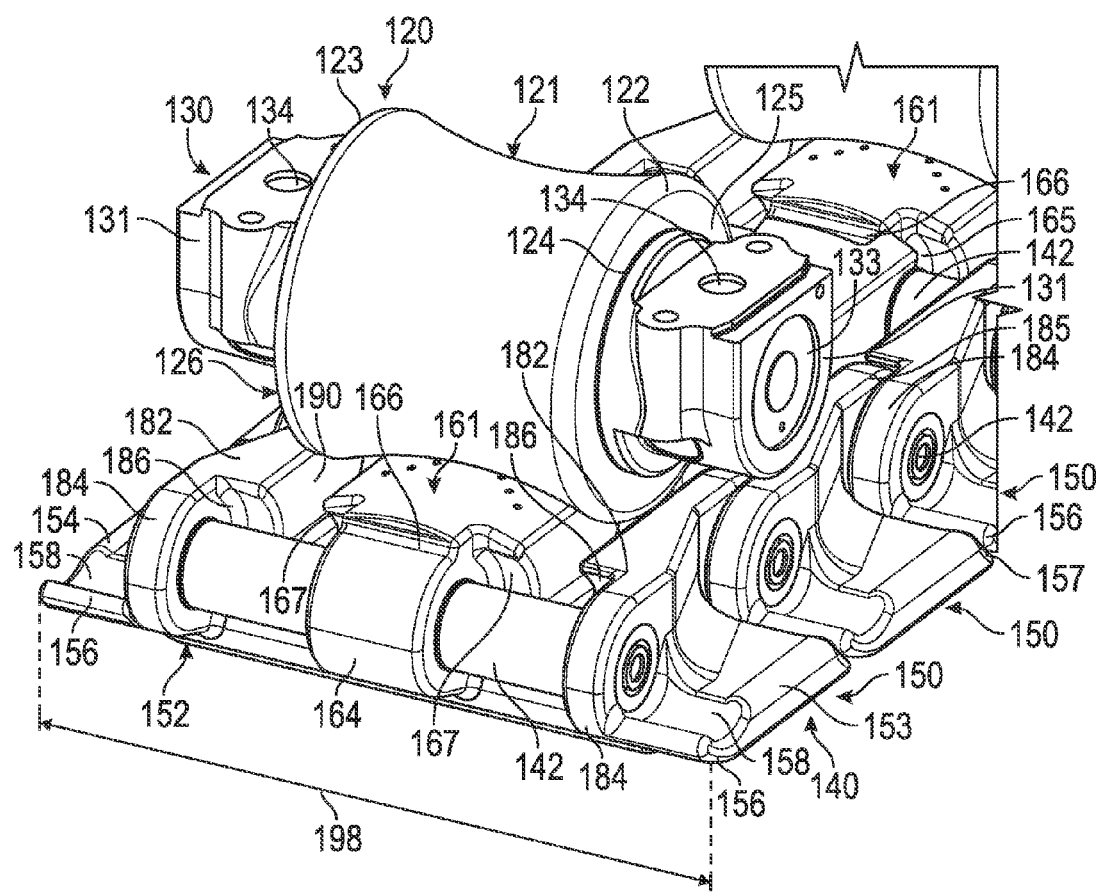
FIG. 3 is an alternate perspective view of the track chain assembly of FIG. 2 contacting rollers.

Each track chain assembly 140 includes track pads 150 inter-connected and linked together by track pins 142 to form a closed chain. FIG. 2 is a perspective view of a portion of the track chain assembly 140 contacting rollers 120. FIG. 3 is an alternate perspective view of the track chain assembly 140 of FIG. 2 contacting rollers 120. Referring to FIGS. 2 and 3, track pads 150 may include a ground engaging portion 151, a body portion 160, a first side rail 180 and a second side rail 181.

Ground engaging portion 151 may include a ground engaging surface 152, a first ground engaging extension 153, and a second ground engaging extension 154. Ground engaging surface 152 may be a flat surface and may be configured to contact and engage with the ground during operation of machine 50. First ground engaging extension 153 may extend beyond first side rail 180, while second ground engaging extension 154 may extend beyond second side rail 181, extending at least a portion of the width 198 of the track pad 150.

First ground engaging extension 153 and second ground engaging extension 154 may not span the full length 199 of the track pad 150. However they may span over half the length 199 of the track pad 150. First ground engaging extension 153 and second ground engaging extension 154 may each include a first overlapping portion 156 and a second overlapping portion 157. The first overlapping portion 156 of a track pad 150 and second overlapping portion 157 of an adjacent track pad 150 are generally configured to overlap without interference. In the embodiment illustrated, the first overlapping portion 156 extends in a forward direction 98 and away from ground engaging surface 152, while second overlapping portion 157 extends in an aft direction 99 forming a wedge like shape. Aft direction 99 may also be referred to as a first direction, while forward direction 98 may also be referred to as a second direction.

First ground engaging extension 153 and second ground engaging extension 154 may also include a pin recess 158. Pin recess 158 may be formed in first overlapping portion 156 and may be configured to allow for insertion and removal of track pins 142 without interference.

Body portion 160 extends from ground engaging portion 151 in the direction opposite ground engaging surface 152, which may be perpendicular to the forward direction 98 and the aft direction 99. Body portion 160 includes roller engaging surface 161. Roller engaging surface 161 is a convex surface distal to ground engaging surface 152. The convex surface may include the curvature of a right circular cylinder with its axis oriented in the direction of length 199 of the track pad 150, extending from a first end 162 to a second end 163. The second end 163 is distal to the first end 162.

The first end 162 of a track pad 150 may be configured to interlock with a second end 163 of an adjacent track pad 150. The first end 162 may include one or more first body flanges 164, and the second end 163 may include one or more second body flanges 165. In the embodiment shown, first end 162 includes one first body flange 164 centered in the width 198 of track pad 150, and second end 163 includes two second body flanges 165 symmetrically located and spaced apart such that first body flange 164 can fit there between. First end 162 and second end 163 may each include one or more body interlocking recesses 167. Each body interlocking recess 167 may be configured to receive either a first body flange 164 or a second body flange 165 and may be adjoining either a first body flange 164 or a second body flange 165. The body interlocking recess 167 at the second end 163 may be located between two second body flanges 165.

First end 162 and second end 163 may also be configured with a sprocket engaging recess 166. The sprocket engaging recesses 166 of a first end 162 adjacent a second end 163 of an adjacent track pad 150 may be configured to engage with the sprockets of the drive sprocket wheel 114 to transfer power from the drive sprocket wheel 114 to the track chain assembly 140.

The first side rail 180 and the second side rail 181 extend from ground engaging portion 151 in the same direction as body portion 160. First side rail 180 and second side rail 181 are each spaced apart from body portion 160 along the width 198 forming a roller edge gap 190 there between. First side rail 180 and second side rail 181 are located on opposite sides of body portion 160.

First side rail 180 and second side rail 181 each include a first rail end 182 and a second rail end 183. First side rail 180 and second side rail 181 may each span the length 199 of track pad 150 from the first rail end 182 to the second rail end 183. First rail end 182 may align lengthwise with first end 162, and second rail end 183 may align lengthwise with second end 163. First rail end 182 and second rail end 183 may be interlocking ends. First rail end 182 may include one or more first rail flanges 184, and second rail end 183 may include one or more second rail flanges 185. The first rail flanges 184 and the second rail flanges 185 may be offset relative to the width 198, such that the first rail flanges 184 of a track pad 150 are not in interference with the second rail flanges 185 of an adjacent track pad 150 within a track chain assembly 140.

The first rail flanges 184 may align with the one or more first body flanges 164 with the axes of the one or more first rail flanges 184 and the one or more first body flanges 164 may aligning. The second rail flanges 185 may align with the one or more second body flanges 165 with the axes of the one or more second rail flanges 185 and the one or more second body flanges 165 may aligning. The alignment of the flanges may allow a track pin 142 can be inserted and extend through the first body flanges 164 and extend at least partially through the first rail flanges 184 of a track pad 150, and through the second body flanges 165 and the second rail flanges 185 of an adjacent track pad 150 within a track chain assembly 140 without binding.

The first rail end 182 and the second rail end 183 may also include one or more rail interlocking recesses 186. A rail interlocking recess 186 of a first rail end 182 may align relative to the width 198 and may be configured to receive a second rail flange 185. A rail interlocking recess 186 of a second rail end 183 may be similarly situated.

In the embodiment illustrated, each first rail end 182 includes one first rail flange 184 and an adjoining rail interlocking recess 186, where the rail interlocking recesses 186 are located between the first rail flanges 184 of the first side rail 180 and the second side rail 181; and each second rail end 183 includes one second rail flange 185.

Roller 120 includes a roller surface 121, a first roller side 125, a second roller side 126, a first edge 122, a second edge 123, and a bore 124. Roller surface 121 is a concave surface, such as a catenoid or a hyperboloid extending between the first roller side 125 and the second roller side 126. In the embodiment illustrated, roller surface 121 is a concave surface of revolution formed by revolving a circular arc about an axis with the concavity of the arc facing the direction opposite the axis. Roller surface 121 may extend from the first edge 122 to the second edge 123, the second edge 123 being distal to the first edge 122. The first edge 122 and the second edge 123 may be circular. The first edge 122 and the second edge 123 may be rounded. The first roller side 125 may be an annular surface extending radially inward from roller surface 121 defining first edge 122 at the intersection there between, and the second roller side 126 may be an annular surface extending radially inward from roller surface 121, opposite first roller side, defining second edge 123 at the intersection there between.

Roller 120 may be a solid of revolution formed by revolving a closed shape bound by the circular arc of roller surface 121 and by a bore defining line parallel to the axis located between the circular arc and the axis. The first roller side 125 and the second roller side 126 may be defined by straight lines extending from each end of the arc and intersecting the bore defining line at perpendicular angles. Revolving the closed shape forms the roller surface 121 around the outside of roller 120 and forms a bore 124 there within.

The track roller frame assembly 110 may include a roller mounting assembly 130 for each roller 120 to connect each roller 120 to supporting structure 66. Roller mounting assembly 130 may include first connection hardware 131, second connection hardware 132, a roller pin 133, and securing pins 134. First connection hardware 131 adjoins first roller side 125, and second connection hardware 132 adjoins second roller side 126. In embodiments, bore 124 includes a counter bore at each side with first connection hardware 131 and second connection hardware 132 extending into the counter bore. Roller pin 133 extends from within first connection hardware 131 through bore 124 to within second connection hardware 132.

A securing pin 134 may extend through each end of roller pin 133 to secure roller pin 133 to first connection hardware 131 and second connection hardware 132. Securing pins 134 may be configured to prevent rotation of roller pin 133 relative to first connection hardware 131 and second connection hardware 132. Roller mounting assembly 130 and roller pin 133 may be configured to allow roller 120 to rotate relative to Roller mounting assembly 130 and roller pin 133. Roller mounting assembly 130 may further include bearing assemblies to assist in the relative rotation of roller 120.

Figure 4:
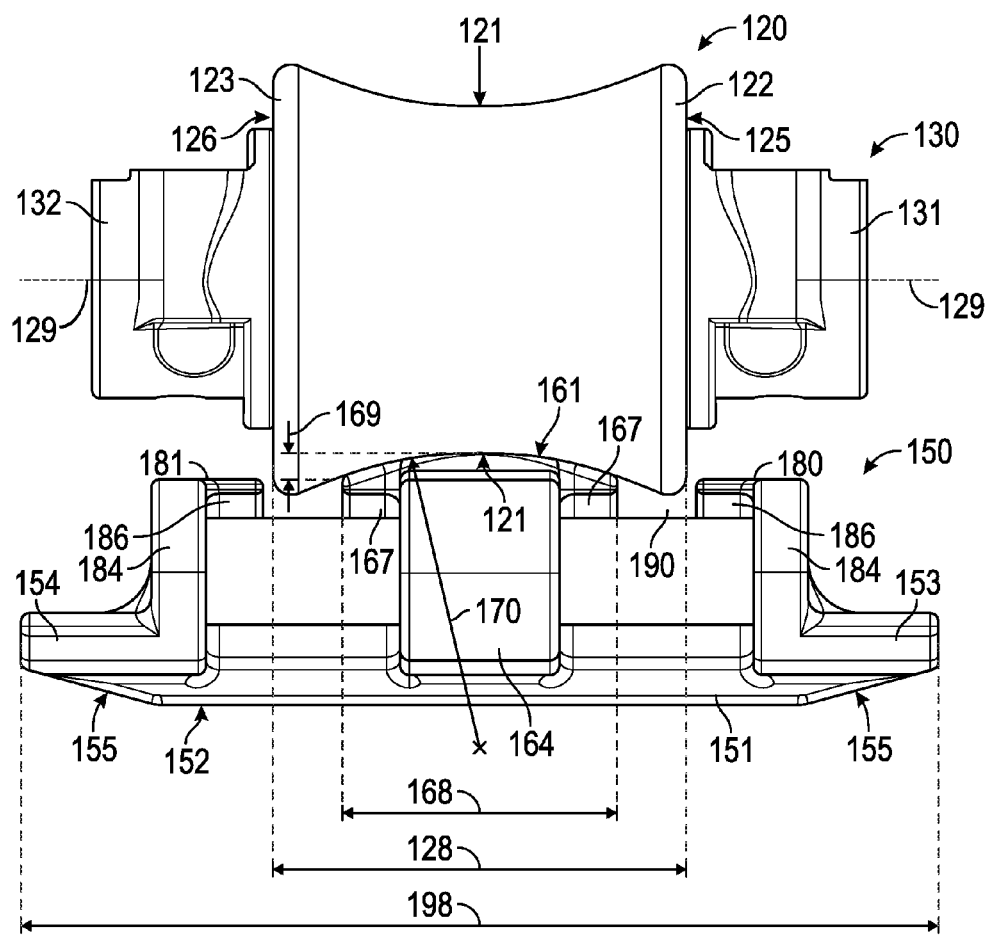
FIG. 4 is a front elevational view of a track pad and a roller of FIGS. 2 and 3.

FIG. 4 is a front elevational view of a track pad 150 and a roller 120 of FIGS. 2 and 3. As illustrated in FIG. 4, the convex shape of roller surface 121 may match the concave shape of roller engaging surface 161. In the embodiment shown, the radius 170 is the radius of curvature of the arc defining roller surface 121 as a surface of revolution and the radius of curvature of the portion of the right circular cylinder defining roller engaging surface 161.

The roller width 128, the distance from first roller side 125 to second roller side 126 may be wider than the body width 168 (the body width 168 may be narrower than the roller width 128), and the arc length of roller surface 121 may be longer than the arc length of roller engaging surface 161 (the arc length of the roller engaging surface 161 may be shorter than the arc length of the roller surface 121).

As illustrated roller engaging surface 161 is configured to have 100% contact with roller surface 121 and is configured to maintain that contact for at least 10 degrees of articulation between track pad 150 and roller 120 in either the clockwise or counterclockwise directions while the roller engaging surface 161 is in contact with the roller surface 121. The relative rotation may be the angle between the ground engaging surface 152 and the axis 129 of roller 120, the axis 129 being the axis or rotation of roller 120.

Body portion 160 may be described generally as having a shape of a cuboid capped with a horizontal cylindrical segment extending from ground engaging portion 151, where the horizontal cylindrical segment is defined by roller engaging surface 161.

While allowing for rotation between track pad 150 and roller 120, the curvature of roller surface 121 and roller engaging surface 161 may be configured to prevent lateral translation between track pad 150 and roller 120 in the axial direction of axis 129, where roller 120 laterally translates closer to either the first side rail 180 or the second side rail 181. The segment height 169 of the horizontal cylindrical segment, the relative distance measured in the direction perpendicular to the ground engaging surface 152 from an edge of roller engaging surface 161 to the apex of roller engaging surface 161, may be configured with lateral interference to prevent lateral translation, rather than including a separate lateral translation prevention feature. The roller engaging surface 161 may protrude into roller surface 121 to create lateral interference and prevent/reduce this lateral translation.

In some embodiments, the protrusion of roller engaging surface 161 may be defined by the ratio of the segment height 169 over the radius 170. In one embodiment, the ratio of the segment height 169 over the radius 170 is at least 0.05. In another embodiment, the ratio of the segment height 169 over the radius 170 is from 0.05 to 1.0. In yet another embodiment, the ratio of the segment height 169 over the radius 170 is at least 0.06.

In other embodiments, the protrusion of roller engaging surface 161 is defined by the ratio of the segment height 169 over the chord length of the horizontal cylindrical segment and of the roller engaging surface 161. The body width 168 may be the chord length of the horizontal cylindrical segment. In one embodiment, the segment height 169 over the chord length is from 0.05 to 0.5. In another embodiment, the segment height 169 over the chord length is from 0.1 to 0.4.

As illustrated in FIG. 4, the first ground engaging extension 153 and the second ground engaging extension 154 may each include an extension surface 155. Each extension surface 155 may extend laterally from ground engaging surface 152 and may be angled relative to ground engaging surface 152 so as to not touch the ground when ground engaging surface 152 is on flat ground.

The track pad 150 and the various features described herein may be a single cast component. Some of the features, such as the various flanges and their corresponding holes may be machined into the track pad 150 after casting. The various components of the articulating track system 100 including the rollers 120, the track pads 150, track pins 142, and roller pins 133 may be made from differing chemistry of steels and other metals.

INDUSTRIAL APPLICABILITY

Machines, such as hydraulic mining shovels, excavators, wheel loaders, cable shovels, bucket wheels, and draglines are commonly used in the construction and mining industries to dig, excavate, move, and load materials, such as rock soil, overburden, and ore during mining and construction processes. In heavy duty applications, these machines can weigh 1,500 tons or more. The undercarriage track systems including one or more track chain assemblies formed by interconnected track pads are often subject to high Hertzian stresses and wear between the interconnected track pads and rollers as articulation occurs between the track pads and rollers which may occur do to the uneven/inclined ground often found in mining and construction sites.

The articulating track system 100 as disclosed herein includes track pads 150 with a convex roller engaging surfaces 161, and rollers 120 with corresponding roller surfaces 121. As the track pads 150 articulate relative to the rollers 120 due to influences, such as uneven/inclined ground and lateral forces, the roller engaging surface 161 may ride within the roller surface 121 and may maintain 100 percent contact with roller surface 121. In some embodiments, the roller engaging surface 161 articulates in either direction at least up to 10 degrees.

Maintaining a high percentage of contact between roller engaging surface 161 and roller surface 121 may keep the forces and stresses spread out over the roller engaging surfaces 161 and roller surfaces 121, which may reduce stress concentrations, reducing Hertzian stresses, and may reduce wear such as spalling along roller engaging surfaces 161 and roller surfaces 121. A reduction in wear may increase wear life and may decrease failures of track pads 150 and rollers 120, resulting in less repairs, replacements, and any associated machine downtime. Such reduction may reduce expenditures and other losses that may occur when a machine 50 is in for repairs rather than operating.

During operation, lateral forces can also cause misalignment between track pads and rollers. The concavity of roller surface 121 and roller engaging surface 161 may further maintain alignment between track pads 150 and rollers 120, rather than requiring a separate feature to maintain that alignment. Roller surface 121 may act as a guide when a relative lateral force is applied to track pads 150. Roller engaging surface 161 may ride along roller surface 121, keeping roller engaging surface 161 within the pocket formed by the concavity of roller surface 121. This alignment interaction may reduce the complexity of the rollers 120 and track pads 150 by requiring fewer features for each component.

The preceding detailed description is merely exemplary in nature and is not intended to limit the invention or the application and uses of the invention. The described embodiments are not limited to use in conjunction with a particular type of machine. Hence, although the present disclosure, for convenience of explanation, depicts and describes particular track system, it will be appreciated that the track pad and roller in accordance with this disclosure can be implemented in various other configurations, can be used with various other types of track systems, and can be used in other types of machines. Furthermore, there is no intention to be bound by any theory presented in the preceding background or detailed description. It is also understood that the illustrations may include exaggerated dimensions to better illustrate the referenced items shown, and are not consider limiting unless expressly stated as such.

What is claimed is:

1. A track pad of an articulating track system for a machine, the track pad comprising:
   a ground engaging portion including a ground engaging surface that engages the ground during operation of the machine;
   a body portion extending from the ground engaging portion in a direction opposite the ground engaging surface, the body portion including
       a first end,
       a second end opposite the first end, and
       a roller engaging surface distal to the ground engaging surface, the roller engaging surface being a convex surface;
   a first side rail extending from the ground engaging portion in the same direction as the body portion, the first side rail being spaced apart from the body portion forming a first roller edge gap there between; and
   a second side rail extending from the ground engaging portion in the same direction as the body portion, the second side rail being located opposite the first side rail and spaced apart from the body portion forming a second roller edge gap there between.

2. The track pad of claim 1, wherein the roller engaging surface includes curvature of a right circular cylinder, the right circular cylinder having an axis oriented in a first direction extending from the first end to the second end.

3. The track pad of claim 1, wherein the first end includes a first body flange and the second end includes a second body flange.

4. The track pad of claim 3, wherein the first end further includes a body interlocking recess that receives the second body flange of an adjacent track pad within the articulating track system.

5. The track pad of claim 3, wherein the first side rail and the second side rail each include:
   a first rail end including a first rail flange, the first rail flange of the first side rail and the second side rail aligning with the first body flange; and
   a second rail end including a second rail flange, the second rail flange of the first side rail and the second side rail aligning with the second body flange.

6. The track pad of claim 5, wherein the first rail end of the first side rail and the second side rail includes a rail interlocking recess adjoining the first rail flange, the rail interlocking recess that receives the second rail flange of the adjacent track pad within the articulating track system.

7. The track pad of claim 1, wherein the first end and the second end include a sprocket engaging recess.

8. An articulating track system for a machine, the articulating track system comprising:
   a plurality of rollers, each roller of the plurality of rollers including
       a first roller side,
       a second roller side spaced apart from the first roller side defining a roller width, and
       a roller surface extending between the first roller side and the second roller side, the roller surface being a concave surface of revolution; and
   a track chain assembly including
       a plurality of track pads, each track pad of the plurality of track pads including
           a ground engaging portion including a ground engaging surface that engages the ground during operation of the machine;
           a body portion extending from the ground engaging portion in a direction opposite the ground engaging surface, the body portion including
               a first end,
               a second end opposite the first end,
               a roller engaging surface distal to the ground engaging surface, the roller engaging surface being a convex surface including curvature of a right circular cylinder with its axis oriented in a first direction extending from the first end to the second end, and
               a body width narrower than the roller width, the body width being a chord length of the roller engaging surface, and
       a plurality of track pins where each track pin of the plurality of track pins secures a track pad of the plurality of track pads to an adjacent track pad.

9. The articulating track system of claim 8, wherein the roller surface is formed by revolving a circular arc about an axis with a concavity of the arc facing a direction opposite the axis.

10. The articulating track system of claim 8, wherein the roller engaging surface is configured to have 100% contact with the roller surface and is configured to maintain that contact for at least 10 degrees of articulation between the track pad and the roller while the roller engaging surface is in contact with the roller surface.

11. The articulating track system of claim 8, wherein each track pad of the plurality of track pads further includes:
   a first side rail extending from the ground engaging portion in the same direction as the body portion, the first side rail being spaced apart from the body portion forming a first roller edge gap there between; and a second side rail extending from the ground engaging portion in the same direction as the body portion, the second side rail being located opposite the first side rail and spaced apart from the body portion forming a second roller edge gap there between.

12. The articulating track system of claim 11, wherein each roller of the plurality of rollers further includes:

a first edge formed at a first intersection of the roller surface and the first roller side; and a second edge formed at a second intersection of the roller surface and the second roller side;

wherein the first edge is located within the first roller edge gap and the second edge is located within the second roller edge gap while the roller engaging surface is in contact with the roller surface.

13. The articulating track system of claim 11, wherein:

the first end includes a first body flange;

the second end includes a second body flange; and the first side rail and the second side rail each include a first rail end including a first rail flange, and a second rail end including a second rail flange;

wherein the track pin extends through the first body flange and at least partially through the first rail flange of the first side rail and the first rail flange of the second side rail of the track pad; and wherein the track pin also extends through the second body flange, the second rail flange of the first side rail, and the second rail flange of the second side rail of the adjacent track pad without binding.

14. The articulating track system of claim 13, wherein the ground engaging portion includes:

a first ground engaging extension extending beyond the first rail; and a second ground engaging extension extending beyond the second rail;

wherein the first ground engaging extension and the second ground engaging extension each include a pin recess for insertion and removal of the track pin.

15. The articulating track system of claim 13, the roller engaging surface protrudes into the roller surface to create lateral interference.

16. A track pad of an articulating track system for a machine, the track pad comprising:

a ground engaging portion including a ground engaging surface that engages the ground during operation of the machine;

a body portion extending from the ground engaging portion in a direction opposite the ground engaging surface and generally having a shape of a cuboid capped with a horizontal cylindrical segment, the body portion including a first end including a first body flange, a second end opposite the first end, the second end including two second body flanges spaced apart and a body interlocking recess located between the second body flanges, and a roller engaging surface distal to the ground engaging surface, the roller engaging surface being a convex surface defining the shape of the horizontal cylindrical segment with its axis oriented in a first direction extending from the first end to the second end;

a first side rail extending from the ground engaging portion in the same direction as the body portion, the first side rail being spaced apart from the body portion forming a first roller edge gap there between the first side rail including a first rail end including a first rail flange and a first rail interlocking recess adjoining the first rail flange, and a second rail end distal to the first rail end and including a second rail flange; and a second side rail extending from the ground engaging portion in the same direction as the body portion, the second side rail being located opposite the first side rail and spaced apart from the body portion forming a second roller edge gap there between, the second side rail including a third rail end including a third rail flange and a second rail interlocking recess adjoining the third rail flange, and a fourth rail end distal to the third rail end and including a fourth rail flange.

17. The track pad of claim 16, wherein the first body flange, the first rail flange, and the third rail flange align so as to receive a track pin without binding, and the second body flange, the second rail flange, and the fourth rail flange align so as to receive the track pin without binding.

18. The track pad of claim 16, wherein the roller engaging surface protrudes into a pocket formed by a roller surface of a roller of the machine to create lateral interference during operation of the machine.

19. The track pad of claim 16, wherein a ratio of a segment height of the horizontal cylindrical segment over a radius defining the roller engaging surface is at least 0.05.

20. The track pad of claim 16, wherein the wherein the first end and the second end include a sprocket engaging recess.

* * * * *